Figure 1:
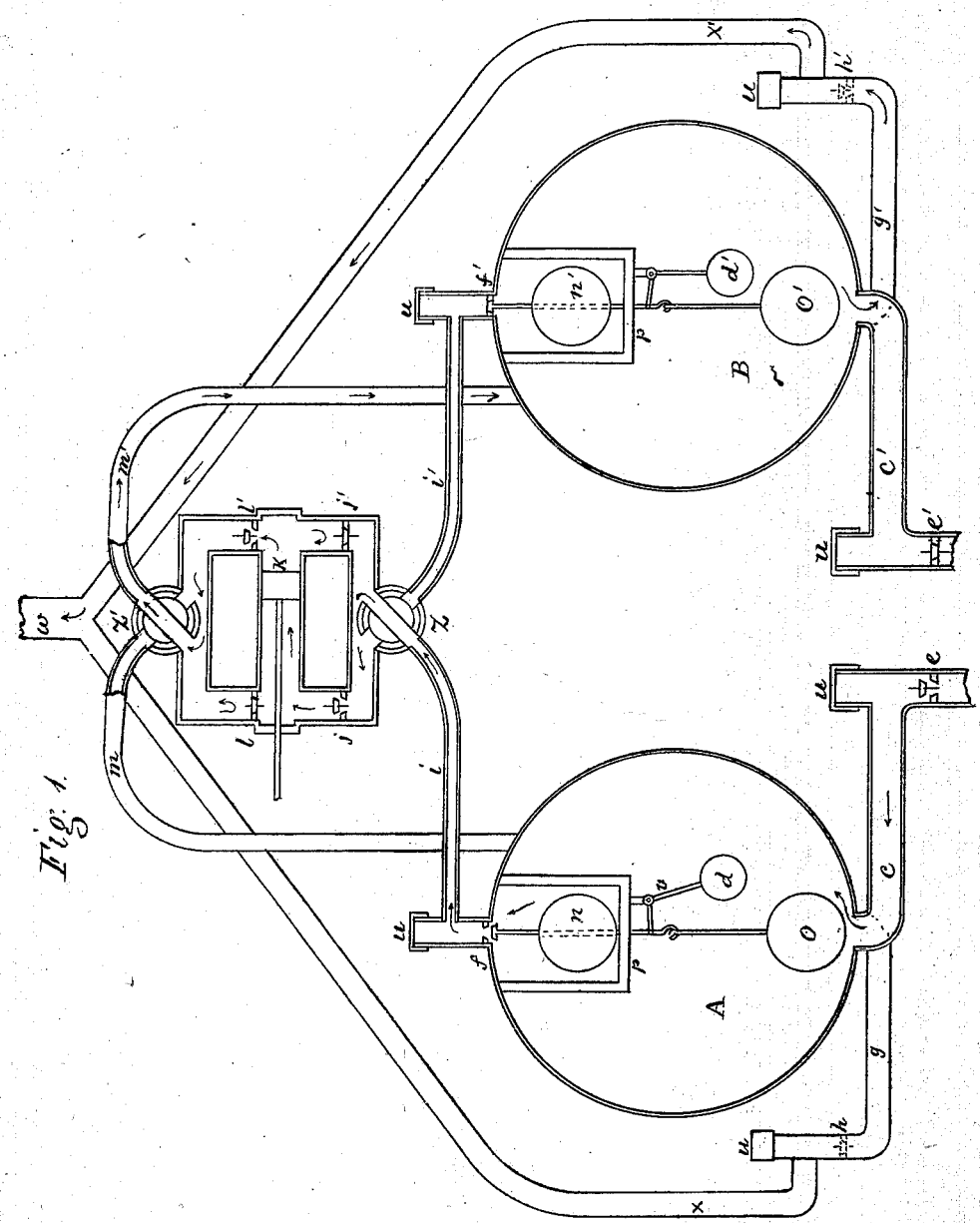

J. M. BROOKE.
Apparatus for Forcing Water by Direct Condensation of Air.

No. 139,538. Patented June 3, 1873.

Witnesses.
Joseph L. Coombs
T. M. Coombs.

Inventor.
John M. Brooke
By J. S. Coombs
Attorney.

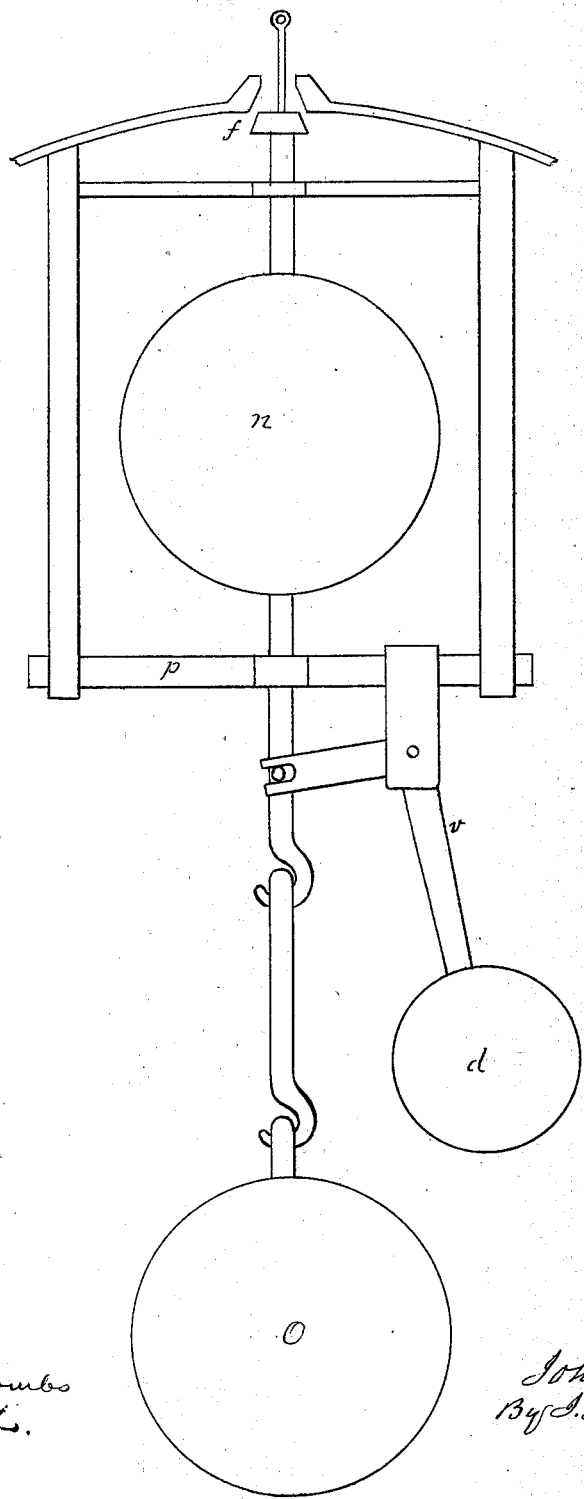

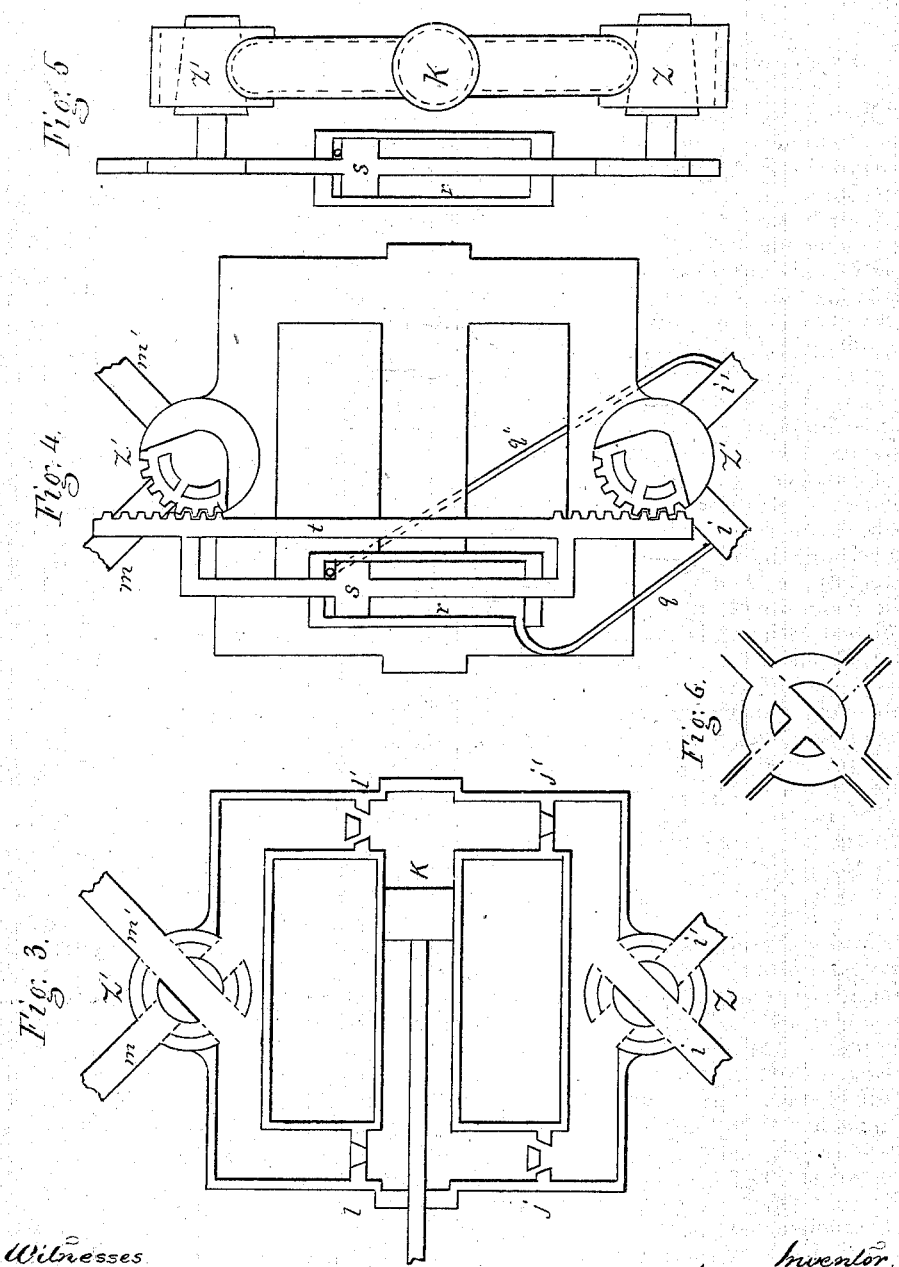
J. M. BROOKE.
Apparatus for Forcing Water by Direct Condensation of Air.
No. 139,538. Patented June 3, 1873.

UNITED STATES PATENT OFFICE.

JOHN M. BROOKE, OF LEXINGTON, VIRGINIA, ASSIGNOR OF ONE-HALF HIS RIGHT TO THOMAS T. MUMFORD.

IMPROVEMENT IN APPARATUS FOR FORCING WATER BY DIRECT CONDENSATION OF AIR.

Specification forming part of Letters Patent No. 139,538, dated June 3, 1873; application filed January 6, 1873.

*To all whom it may concern:*

Be it known that I, JOHN M. BROOKE, of Lexington, Rockbridge county, State of Virginia, have invented Improvements in Pneumatic and Hydraulic Apparatus for forcing water from containing-vessels by direct condensation of air in such vessels, of which the following is a specification:

The object of this improvement is to maintain a continuous flow of water, to utilize the tension of the condensed air after the water has been expelled from the vessel, and to refill the vessel with water, the whole apparatus, except the condensing-air pump, operating automatically and continuously.

It consists, as shown in the accompanying drawings, of two vessels A and B, placed in any convenient position not exceeding the height to which water may be readily drawn by a suction-pump, above the level of the source of supply, with which they are respectively in communication by the pipes C and C', furnished with admission-valves $e$ and $e'$. Each vessel has in its upper part an emission air-valve, opening into pipes $i$ and $i'$, and in its lower part a discharge water-pipe, $g$ and $g'$, with emission or check-valves $h$ and $h'$. The pipes $x$ and $x'$ unite at W in a single pipe, through which water is conveyed to a distance. The air-pipes $i$ and $i'$ are in connection with the admission-valves $j$ and $j'$ of the air-pump K, according to the position of the cock Z. The emission-valves $l$ and $l'$ of the air-pump communicate by the pipes $m$ and $m'$, according to the position of the cock Z', with the vessel A or B. This arrangement of the pipes and air-pump permits the transfer of air from one vessel to the other alternately, so that the air that has been condensed in expelling the water from A may be transferred to B, and this is effected as follows: The air-valve $f$ is attached to a float, $n$, Fig. 1, from which is suspended a mass of some material, of which the weight and displacement are so proportioned that when submerged its weight will be only sufficient to maintain the position of vertical suspension under the float $n$, but whose weight in air, when added to that of the float, is sufficient to draw the valve from its seat. A shell of iron is convenient for this purpose. The vessels are first filled with water by exhausting the air in both, the emission valves $l$ and $l'$ of the air-pump communicating directly with the external atmosphere by a suitable cock, which is afterward closed. The admission-valves $j$ and $j'$ of the air-pump are then put in direct communication with the external atmosphere by a similar cock, and in one of the vessels A air is condensed. The contained water passes into the pipe $x$, lowering its level in the vessel. The float-valve is then retained in its seat by the pressure of the air, with a force proportional to its tension and the area of the valve aperture. The tension will be that due to the height of the column of water in the pipe $x$. If the pipe $x$ be large in proportion to the volume of the vessel, it may be necessary on first filling the vessels to hold the valve in its seat. Provision is made for this, access to all the valves being afforded by removing the caps $u$ over them. When the water falls below the mass O, the weight of the latter, in air, is added to that of the float, and their combined weight exceeding the pressure of the air upon the inner surface of the valve, it drops from its seat (Fig. 2), the distance depending upon the position of the cross-bar P, through which the guide-rod of the float passes. The shock which would otherwise attend the fall of the weight, especially in the case of large valve-apertures and high tensions, is entirely obviated by the counterpoise $d$ on the lever end of the bell-crank $v$, without affecting the operation of the valve. The condensed air escapes into the pipe $i$ and flows to the cock Z, which may be open or closed. In the latter case, the air entering the small pipe $q$ passes into a cylinder, $r$, and presses upon a piston, $s$, attached to a rack, $t$, whose teeth engage with the pinions of the cocks Z and Z', which are thus both opened, permitting the air to pass through the air-pump, as indicated by the arrows, into the vessel B. The rack is maintained in position by slight friction. The check-valve $h$ of $g$, closing, retains the column of water in the pipe $x$. The water in the pipe $x'$ is now subjected to the pressure of the condensed air from A in addition to that due the height of water in B, and is instantly put in motion; but as the tension of the air from A diminishes in proportion to its expansion, this action soon ceases. The air-pump then transfers air from A, condensing it in B. As the air in A becomes rarefied, water enters by the pipe $c$, rises, and, lifting the float-valve, closes it. When the water in B falls below the mass O', the valve $f'$ opens, and the air, passing into the pipe $i'$, enters by the small pipe $q'$ the cylinder $r$, and, acting upon the piston, reverses the cocks Z and Z', through which the remaining air of B passes into A, expelling the water, and so alternately the two vessels are refilled and discharged. The cocks Z and Z' are not necessarily attached to the air-chamber. The pipes $i$ and $i'$ and $m$ and $m'$ may intersect before reaching the air-chamber. In that case cocks (Fig. 6) are placed at the intersections, and the pipes communicate directly with the valves of the air-pump, the cocks being operated as before stated.

To illustrate the application of the principles upon which this apparatus is constructed, we will assume that in a particular case the tension in the vessel A, due to the height of the column, is 40 pounds per square inch, the area of the valve one-half inch. The pressure tending to keep the valve closed is therefore 20 pounds. The float, valve, and spindle weigh 10 pounds; the submerged mass, 2 pounds; total, 12 pounds; leaving $20 - 12 = 8$ pounds effective pressure to retain the valve in in its seat, until the water, falling below the mass O, its weight, in air, 15.7 pounds, is added to that of the float, giving a total of $10 + 15.7 = 25.7$ pounds, or 5.7 pounds $(25.7 - 20)$ more than the pressure of the air upon the valve, which is thus opened. The compensation-weight on the bell-crank lever-arm, 22.7 pounds, reduces the pressure of the float upon the cross-bar $p$, when the valve is down, to $25.7 - 22.7 = 3$ pounds.

The proportions are varied to suit particular cases.

The float-valve, as described, may be employed also in single vessels to act automatically, and permit the escape of the condensed air when the water has been expelled.

In the accompanying drawings, Figure 1 is a representation, in cross-section, of the apparatus, showing the two water vessels and the air-pump, with the induction and eduction water-pipes, air-pipes, cocks, and valves, some of the attachments, however, being omitted and shown in separate figures. Fig. 2 is a view, on an enlarged scale, of the mechanism for automatically operating the air-valve $f$. Fig. 3 is a sectional view of the air-pump, with its ports and valves. Fig. 4 is a sectional view of the mechanism for automatically operating the stop-cocks Z and Z'. Fig. 5 is an end view of the air-pump, with some of its attachments; and Fig. 6 is a cock to be used if the pipes $x$ and $x'$ and $m$ and $m'$ intersect before reaching the air-chamber.

It will be seen that, by the construction and arrangement of the pipes, valves, cocks, and ports, as shown and described, the piston of the air-pump transfers condensed air from one water-vessel to the other at each stroke, whether forward or backward, thus keeping up a continuous and unremitting flow of water from said vessels A and B, alternately. It will also be seen that by means of the float-valves $f$ and $f'$, with their attachments, and the cylinder $r$, piston $s$, and rack $t$, engaging with the toothed sectors on cocks Z and Z' and the connecting air-pipes $q$ and $q'$, the whole apparatus is made to operate automatically, by fluid pressure, except the air-pump, which may be driven by any known power adapted thereto.

What I claim as my invention, and desire to secure by Letters Patent, is—

1. The two containing-vessels A and B, in combination with the double-acting air-pump, and the ports, valves, pipes, and cocks, by means of which condensed air is transferred, alternately, from one containing-vessel to the other, to expel the water therefrom at each stroke of the piston of the air-pump, substantially as described.

2. In combination with the containing-vessels A B, the air-pump, and induction and eduction pipes, valves, ports, and cocks, the floats $n$ and $n'$, with the weights O and O', valves $f$ and $f'$, cylinder $r$, piston $s$, rack $t$, engaging with the toothed sectors on cocks Z and Z', and the connecting air-pipes $q$ and $q'$, arranged to operate substantially as described.

3. In combination with the containing-vessels, air-pump, induction and eduction pipes, valves, and cocks, the float $n$, mass O, and counterpoise $d$, for operating the valve $f$, substantially as described.

4. The combination of the containing-vessels, air-pump, pipes, valves, stop-cocks, and cylinder and piston, by which the stop-cocks are operated, all constructed, combined, and arranged to operate automatically, substantially as described.

JOHN M. BROOKE.

Witnesses:
S. H. LETCHER,
RICHARD LILLAUN.